United States Patent [19]

Green

[11] 4,048,292
[45] Sept. 13, 1977

[54] CO PURIFICATION PROCESS

[75] Inventor: Ralph V. Green, Charleston, W. Va.

[73] Assignee: E. I. Du Pont de Nemours and Company, Wilmington, Del.

[21] Appl. No.: 681,593

[22] Filed: Apr. 29, 1976

[51] Int. Cl.$^2$ .................. C01B 31/18; B01D 53/34
[52] U.S. Cl. .................. 423/415 A; 423/246; 423/648 R
[58] Field of Search ............... 423/212, 246, 415 A, 423/648 R

[56] References Cited

U.S. PATENT DOCUMENTS 2,924,886   2/1960   Cullen ............................. 33/363 R

FOREIGN PATENT DOCUMENTS 566,376   11/1958   Canada ............................. 423/415 A
6,408     2/1972    Japan

*Primary Examiner*—Earl C. Thomas

[57] ABSTRACT

High purity CO is made quite efficiently with regard to energy consumption from $CO_2$-free gas streams containing at least 25% by volume CO and also containing $H_2$ and small amounts of other gases such as $N_2$ and $CH_4$ by (1) complexing the CO in aqueous copper ammonium acylate absorbent solution, (2) stripping the absorbent solution with a small stream of purified CO to desorb traces of noncomplexed gases and (3) decomplexing the absorbent solution to separate purified CO, a small portion of which is recycled to the stripping step.

7 Claims, 1 Drawing Figure

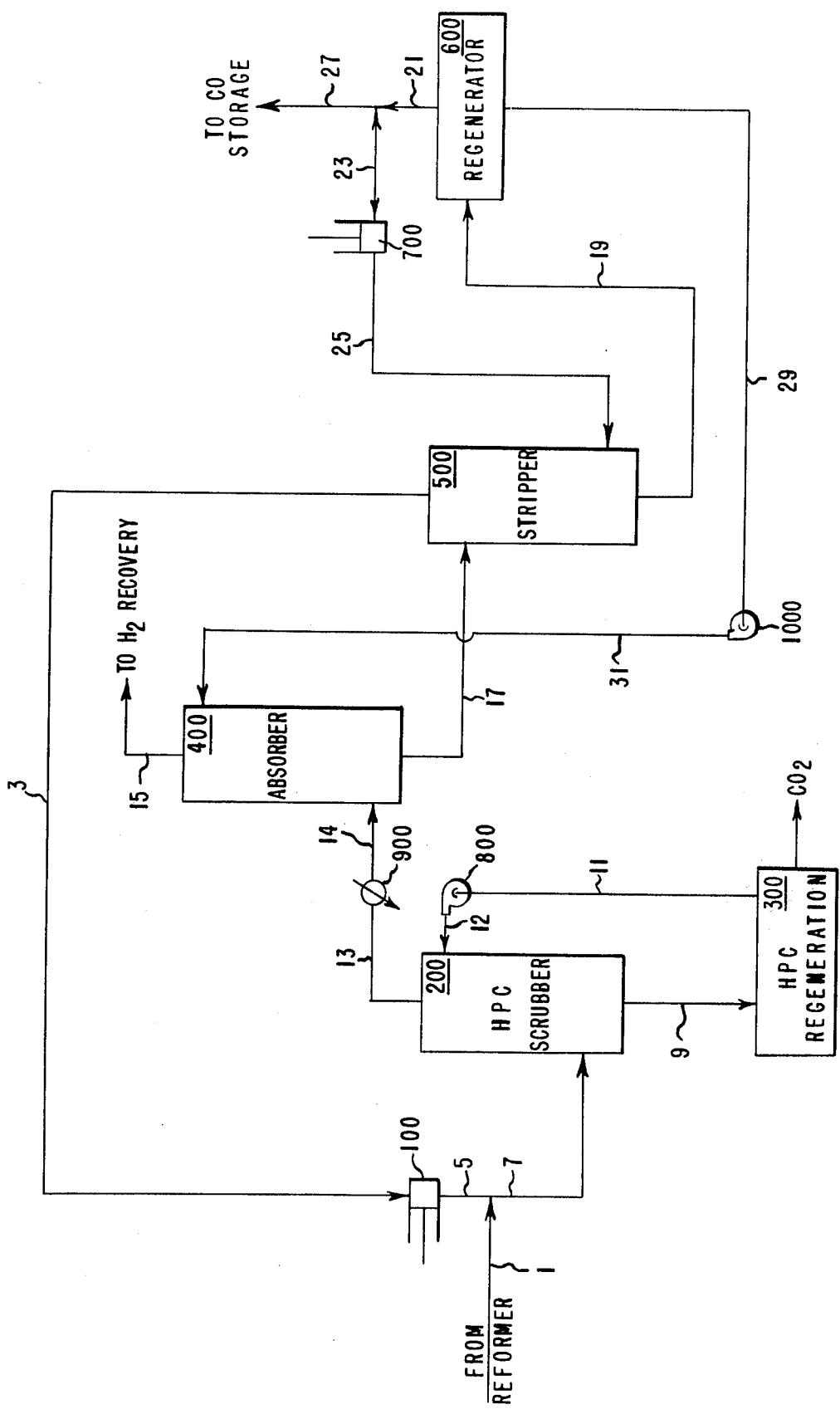

CO PURIFICATION PROCESS

FIELD OF THE INVENTION

The invention is directed to a process for making high purity carbon monoxide (CO) gas from CO-containing streams in which $H_2$ and/or $CH_4$ are contained as impurities. In particular, the invention is directed to such a process having improved efficiency with respect to energy consumption.

BACKGROUND OF THE INVENTION

Because of its reactivity with so many types of materials, carbon monoxide is widely used in the chemical industry. One particularly important use for CO is in the manufacture of phosgene which is widely used for the manufacture of isocyanates. Phosgene is made commercially by reaction of CO and chlorine gas over a catalyst such as activated charcoal, as follows:

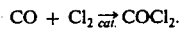

In carrying out this reaction, it is essential that the gas be of the highest purity, particularly with respect to non-condensible impurities which make recovery of the CO more difficult. Thus, hydrogen and hydrocarbons must be essentially completely excluded lest they form HCl, which is non-condensible. Carbon monoxide is, of course, usually made in commercial quantities by processes in which the CO is accompanied by substantial quantities of such impurities. Of the impurities which are most commonly contained in CO-containing gases ($CO_2$, $H_2$, $O_2$, $N_2$ and $CH_4$), it is most difficult to remove $H_2$ and $CH_4$ and thus to obtain quite high purity CO.

DESCRIPTION OF THE PRIOR ART

It is well known in the art to separate CO from gas mixtures by contacting the gas mixture with a solvent which is selective for the CO. For example, U.S. Pat. No. 3,006,729 to Moore et al discloses the extraction of CO from ammonia synthesis gas (primarily $H_2$ and $N_2$) at 1,500-2,500 psig (106-177 $kg/cm^2$) with ammoniacal copper solution after which minor amounts of $H_2$ and $N_2$ contained in the solvent are flashed off at 25-250 psig (2.79-27.9 $kg/cm^2$) and the CO is removed by reducing the pressure still further. In U.S. Pat. No. 2,824,886 to Barry et al, CO is separated from an ammonia-containing gas by absorption in a cuprous ammonium salt and is then separated by stripping the absorbent solution with ammonia. In U.K. patent specification No., 1,318,790, a process is disclosed in which CO is recovered from gas mixtures by absorption and complexing with cuprous aluminum tetrachloride at 1-15 atmospheres. The CO is desorbed by reducing the pressure on the absorbent to below one atmosphere and optionally stripping the absorbent with an inert gas such as $N_2$. Japanese Pat. No. 72/16408 reveals a process for preparing high purity CO by (a) contacting CO-containing gas at a pressure of 280 psig (20.7 $kg/cm^2$) with HCl solution of cuprous chloride, (b) reducing the pressure on the absorbent to 28 psig (2.07 $kg/cm^2$) and stripping impurities with quite high amounts of high purity CO and then (c) diffusing the absorbed CO by reducing the pressure to atmospheric and/or heating the absorption solution. This last process, through very effective, requires very high expenditures of energy and would not be economical for gaseous feeds containing large amounts of CO.

BRIEF DESCRIPTION OF THE INVENTION

The invention is therefore directed to a low energy-consuming process for recovering CO from gas mixtures such as reformer gas and purifying it to levels of at least about 99.5% by volume. In particular, it is directed to a process for the preparation of high purity CO from a $CO_2$-free gaseous stream containing at least about 25% volume CO and also containing $H_2$ comprising a. countercurrently contacting the gaseous stream with a liquid aqueous absorbent solution containing dissolved therein as copper ammonium $C_{1-2}$ acylate from 10 to 18 pbw copper in an amount equivalent to from about 0.2 to about 2.0 gallons of absorbent solution per $ft^3$ (26.7-267 $l/m^3$) of CO in the gaseous stream at a CO partial pressure of at least about 30 psia (2.1 $kg/cm^2$), by which CO reacts with the copper compound to form a stable water-soluble complex, small amounts of $H_2$ and other gases are absorbed into the absorbent solution and the non-absorbed and non-complexed components of the gaseous stream are separated from the absorbent solution;

b. while maintaining the absorbent solution above its decomplexing pressure, countercurrently contacting the absorbent solution with a stream of purified gaseous CO, as defined hereinbelow, by which the absorbed gases are desorbed and separated from the absorbent solution;

c. regenerating the absorbent solution from step (b) by reducing the pressure thereon to a level at which the CO is decomplexed and purified gaseous CO is separated from the absorbent solution;

d. recycling purified gaseous CO to step (b) of the process in an amount equivalent to from about 0.03 to about 0.5 $ft^3$ of CO per $ft^3$ ($M^3/m^3$) of total gaseous CO products separated in step (c); and e. recycling regenerated absorbent solution to step (a) of the process.

DEFINITIONS

The term "decomplexing pressure" refers to the pressure at which the complex of CO and copper compound becomes decomposed, thus releasing CO from the absorbent solution. At constant temperature, the decomplexing pressure relates directly to CO partial pressure. The decomplexing pressure is raised by heating.

All gas volumes expressed herein are based upon standard conditions, i.e., 0° C at 1 atmosphere (1.03 $kg/cm^2$).

All gas percentages are by volume unless expressly indicated otherwise.

DETAILED DESCRIPTION OF THE INVENTION

Suitable feeds for the process of the invention are gas mixtures containing at least about 25% vol. CO and which are essentially free of $CO_2$. The most common feed gas for the process is reformer gas which contains about equal amounts of CO and $H_2$ and is produced by steam reforming of methane. Reformer gas ordinarily contains minor amounts of other gases such as $CO_2$, $N_2$, $O_2$ and $CH_4$.

In order to prevent precipitation of the copper compound from the absorbent solution, it is necessary to remove essentially all $CO_2$ from the feed gas to the process. This is usually done by means of a so-called "hot potassium carbonate" (HPC) scrubber in which the gas is contacted with hot aqueous $K_2CO_3$ solution which reacts with any $CO_2$ present to form $KHCO_3$. By reducing the pressure on the $KHCO_3$, $CO_2$ is volatilized therefrom and the $K_2CO_3$ is regenerated. By this process, the $CO_2$ content of reformer gas can be reduced to 1.0% vol. or even lower. A typical reformer gas stream scrubbed by the HPC process contains 45% CO, 52% $H_2$ and 3% $CH_4$ and $N_2$. Gas feeds comprising 45–55% CO are preferred for the practice of this invention.

The first step of the process is directed to intimately contacting the CO-containing gas with a liquid aqueous absorbent solution of a copper-based complexing agent.

Even though many copper-based compounds are well-known for the absorption of CO, only a very limited class of copper compounds which appear to form a complex with CO are suitable for the invention. These complex-forming materials are copper ammonium $C_{1-2}$ acylates, i.e., formate and/or acetate. They are prepared by dissolving the corresponding acid or acylamide in water, rendering the solution strongly ammoniacal and then circulating the heated ammoniacal solution through a bed of copper chips until the desired level of copper in the solution is obtained.

Care must be taken that the aqueous absorbent solution contains the proper amount of copper. If less than about 10% wt. copper is dissolved therein, the absorptive effectiveness is too low to be economical. On the other hand, if more than about 18% wt. copper is present, it tends to become insolubilized and precipitates out. A range of 12–15% wt. copper is preferred. Only the cuprous form of the copper ammonium acylate is effective for use in the process of the invention. Consequently, the absorbent should contain no more than about 3% wt. cupric copper. Nevertheless, at least about 1% wt. cupric copper is preferred in order to prevent precipitation of copper even at low concentrations.

Using absorbent solutions of the above-described copper concentration, the amount to be used for the complexing step will be from about 0.2 to about 2 gallons of absorbent solution per cubic foot (26.7–267 l/m$^3$) CO in the gas stream. Below about 0.2 gal/ft$^3$, the capacity of the solution is too low to obtain the degree of separation needed for the process. On the other hand, the use of more than about 2 gal/ft$^3$ does not increase the degree of CO recovery and, furthermore, the amount of absorption of other gases becomes greater, thus unnecessarily increasing the amount of CO which must be used to strip out the absorbed gases.

The pressure in the absorption stage of the process should be as high as possible consistent with the economics of the equipment. Thus, while pressures as low as about 50 psig (4.55 kg/cm$^2$) can be used with gases containing low amounts of CO, it is preferred to use higher pressures since more efficient complexing of the CO is obtained. However, at pressures above about 1,000 psig (71.3 kg/cm$^2$), the amount of other gases absorbed into the absorbent solution becomes excessive and greatly increases the amount of CO which must be used to desorb such gases in the desorption of stripping stage of the process. A total pressure of 350–800 psig (25.6–57.3 kg/cm$^2$) in the absorption step is therefore preferred from the standpoint of obtaining a high degree of CO complexing without also increasing excessive absorption of other gases. The intimate contact between the inlet gas and the absorbent solution will usually be accomplished by passing the absorbent solution downwardly and countercurrently to the upward flowing stream of gas in a packed tower.

Similarly, the desorption of the gaseous impurities from the absorption solution can also be accomplished by countercurrent flow through a second packed tower in which purified gaseous CO is passed upwardly through the downflowing stream of absorbent solution.

In order to shift the absorption equilibrium, it is preferred that the stripping operation be conducted at a lower pressure. In particular, it is preferred to carry out the desorption at as low a pressure as possible without incurring decomplexing of the CO. For reformer gases containing 45–55% CO, 75–150 psig (6.3–11.6 kg/cm$^2$) is the preferred pressure for the stripping or desorption of the other gases from the absorbent solution.

It should be noted that it is not ordinarily necessary to carry out any interstage cooling or heating of any of the streams of this process. Both the absorption and desorption steps will ordinarily be carried out at 10°–40° C with the need for either heating or cooling facilities. Only if quite high volumes of gases are absorbed, would the heat of absorption released be sufficient to make interstage cooling necessary.

After stripping the absorbed gases from the absorbent solution, the CO is removed from the absorbent solution by breaking up the complex by which the Co in highly pure form is released from the solution and the ammoniacal copper acylate is regenerated. This is readily accomplished by lowering the total pressure on the stripped complex. It is preferred to regenerate the absorbent solution by lowering the pressure to the lowest economical pressure, which is usually 1 atmosphere. However, subatmospheric pressures are quite desirable, provided they are available. Higher pressures can be used for regeneration, but are on the whole less efficient because the solubility of CO is a direct function of pressure. The regeneration pressure should not exceed about 15 psia (2.1 kg/cm$^2$).

Furthermore, the temperature of the absorbent during regeneration should not exceed about 80° C in order to avoid vaporization of ammonia from the solution and other side reactions. It will be understood that heating of the absorbent can also be ued to decomplex the CO so long as the above-noted decomposition temperature is not exceeded. A regeneration temperature of 20°–=° C is preferred and 25°–35° C appears to be optimum when regenerating at 1 atmosphere.

The amount of purified gaseous CO which must be recycled to the desorption step is kept at a minimum consistent with obtaining adequate removal of the absorbed impurities. When operating within the limits discussed hereinabove, it has been found that as little as 0.03 ft$^3$ of CO per ft$^3$ (M$^3$/m$^3$) of total CO produced may be adequate to strip out the $H_2$ and that no more than 0.5 ft$^3$ of CO per ft$^3$ of total CO produced is needed. A recycle rate of 0.05 –0.15 is preferred.

The invention can be further inderstood by reference to the Drawing which consists of a single figure which is a schematic flow diagram of the process.

Reformer gas containing primarily CO and $H_2$ and minor amounts of $CO_2$, $CH_4$ and $N_2$ at a pressure of about 450 psig (32.7 kg/cm$^2$) is passed through line 1 and mixed with desorbed gases emerging from compressor 100 via line 5. The mixed gas stream is passed through line 7 to the lower part of hot potassium carbonate (HPC) scrubber 200. The HPC scrubber 200 is a vertical packed tower in which the upflowing stream of reformer gas is contacted with a hot downflowing stream of aqueous $K_2CO_3$ solution to extract $CO_2$ from the gas stream. The resultant stream of hot potassium bicarbonate (100° C) is then passed via line 9 to regeneration vessel 300 in which it is heated to release $CO_2$ and thus regenerate the $K_2CO_3$. Temperatures in the HPC regeneration vessel are from about 110° to about 120° C. The regenerated $K_2CO_3$ stream is then returned through line 11, pump 800 and line 12 to the HPC scrubber.

The outlet gas from scrubber 200, from which essentially all the $CO_2$ has been removed, is passed through line 13 at the rate of about 350,000 cubic feet per hour (MCFH) to cooler 900, in which it is cooled from about 90° C to about 25° C. The cooled gas is then fed via line 14 to the lower part of absorber 400. The compsition of the $CO_2$-free gas stream is as follows:

| CO | 158 | MCFH | (4475 m³/hr) |
|---|---|---|---|
| $H_2$ | 181 | " | (5126 m³/hr) |
| $CH_4$ } | 11 | " | (311 m³/hr) |
| $N_2$ | | | |

The absorber 400 is also a vertical packed tower and the inlet gas is passed upward countercurrently to a downflowing stream of regenerated copper ammonium formate absorbent solution as described hereinabove. The flow rate of absorbent solution is 1200 gallons per minute (4542 l/min), which is equivalent to 0.456 gallon of absorbent per cubic foot (60.9 l/m³) of CO in the feed gas to the absorber. Pressure within absorber 400 is about 400 psig (29.2 kg/m²). The temperature of the absorbent liquid entering the top of the tower is about 30° C. The absorbent removes essentially all of the CO from the stream by means of complex formation with the copper ammonium formate. However, minor amounts of $H_2$ (Ca. 10 MCFH) and $CH_4$ and $N_2$ (Ca. 1 MCFH) are absorbed into the solution. The gas, from which most of the CO has been removed, leaves the absorber through line 15 to a hydrogen recovery unit. The exit gas from the absorber has the following composition:

| CO | 12 | MCFH | (340 m³/hr) |
|---|---|---|---|
| $H_2$ | 171 | " | (4843 m³/hr) |
| $CH_4$ } | 9 | " | (255 m³/hr) |
| $N_2$ | | | |

The complexed absorbent solution leaving the absorber is passed via line 17 to the top of stripper 500, also a vertical packed tower, in which the absorbent solution trickles downward countercurrently to an upflowing stream of purified gaseous CO at a pressure of about 100 psig (7.13 kg/cm²). The temperature within the stripper is about 30° C throughout. The stripped gas stream leaving the top of stripper 500 is then recycled through line 3, passed to the inlet of feed compressor 100 discharged via line 5 and admixed with fresh reformer gas feed. Composition of the stripper outlet gas is as follows:

| CO | 10 | MCFH | (283 m³/hr) |
|---|---|---|---|
| $H_2$ | 10 | " | (283 m³/hr) |
| $CH_4$ } | 1 | " | (28.3 m³/hr) |
| $N_2$ | | | |

The complex-containing absorbent solution is then removed from the bottom of the stripping tower 500 through line 19 to regenerator 600 in which the pressure is reduced to essentially 1 atmosphere (2.5 psig or 1.21 kg/cm²). Regenerator 600 is a horizontal cylindrical vessel in which a level of absorbent solution is maintained. The temperature within the absorbent regenerator is also about 30° C throughout. Absorbent solution from stripper 500 enters below this liquid level. As the complexed absorbent is depressured to only about one atmosphere, the complex is broken up and 148 MCFH (4191 m³/hr) of purified CO gas from the top of regenerator 600 via line 21. Only 12 MCFH (340 m³/hr) of the total purified gas stream are passed through line 23 to the inlet of reciprocal compressor 700 in which it is compressed to the operating pressure of the stripping tower 500. The compressed purified gaseous CO is then passed to the bottom of stripping tower 500 through line 25. The remainder of the purified gaseous CO (136 MCFH) is passed via line 27 to a gas holder where it is stored at a pressure of just above one atmosphere. The purified gaseous CO leaving absorbent regenerator 600 has a purity of about 99.5%.

Regenerated absorbent solution is then withdrawn from the bottom of the regenerator 600 and is recycled via line 29, pump 1000 and line 31 to the absorption tower 400.

Energy consumption for the process is as follows:

| | Horsepower | Kilowatts | Kg. Cal/min |
|---|---|---|---|
| Gas Compression | 68 | 51 | 726 |
| Liquid Pumping | 500 | 373 | 5342 |
| | 568 | 424 | 6068 |

By way of comparison, when the energy consumption of the prior art process disclosed in Japanese Patent 72/16408 is determined from the data in the patent on the basis of the same amount of purified gaseous CO recovery (136 MCFH) using the very low CO-containing feed disclosed therein, the energy consumption is as follows:

| | Horsepower | Kilowatts | Kg. Cal/Min |
|---|---|---|---|
| Gas Compression | 6,560 | 4,900 | 70,000 |
| Liquid Pumping | 4,100 | 3,050 | 43,800 |
| | 10,660 | 7,950 | 113,800 |

Thus, the energy consumption for the proces of the invention is much less largely due to the much lower recycle rates for both liquid and gas, which are used in the process of the invention.

I claim:

1. A process for the preparation of high purity CO from a $CO_2$-free gaseous stream containing at least about 25% volume CO and also containing $H_2$ comprising a. countercurrently contacting the gaseous stream with a liquid aqueous absorbent solution containing dissolved therein as copper ammonium $C_{1-2}$ acylate from 10 to 18 pbw copper in an amount equivalent to from about 0.2 to about 2.0 gallons of absorbent solution per ft³ (26.7 – 267 l/m³) of CO in the gaseous stream at a CO partial pressure of at least about 30 psia (2.1 kg/cm₂), by which CO reacts with the copper compound to form a stable water-soluble complex, small amounts of $H_2$ and other gases are absorbed into the absorbent solution and the non-absorbed and non-complexed components of the gaseous stream are separated from the absorbent solution;

b. while maintaining the absorbent solution above its decomplexing pressure, countercurrently contacting the absorbent solution with a stream of purified gaseous CO, as defined hereinbelow, by which the absorbed gases are desorbed and separated from the absorbent solution;

c. regenerating the absorbent solution from step (b) by reducing the pressure thereon to a level at which the CO is decomplexed and purified gaseous CO is separated from the absorbent solution;

d. recycling purified gaseous CO to step (b) of the process in an amount equivalent to from about 0.03 to about 0.5 ft$^3$ of CO per ft$^3$ of total gaseous CO product separated in step (c); and e. recycling regenerated absorbent solution to step (a) of the process.

2. The process of claim 1 in which the desorbed gases from step (b) are recycled in admixture with gaseous feed to step (a) of the process.

3. The process of claim 2 in which the total pressure in step (b) is lower than in step (a) and is 75–150 psig.

4. The process of claim 3 in the gaseous stream contains 45–55% vol. CO and the total pressure in step (a) is at least about 250 psig (18.6 kg/cm$^2$).

5. The process of claim 4 in which the primary gaseous feed to step (a) is methane reformer gas.

6. The process of claim 1 in which the copper ammonium $C_{1-2}$ acylate is copper ammonium formate.

7. The process of claim 1 in which the absorbent solution contains 1–3% wt. cupric ions.

* * * * *